US010618488B2

(12) United States Patent
Balan (10) Patent No.: US 10,618,488 B2
(45) Date of Patent: Apr. 14, 2020

(54) SAFETY DEVICE FOR DELIVERING AN ANTI-TRAUMA SUBSTANCE IN AN AUTOMOBILE COLLISION

(71) Applicant: Alexandru Balan, Hickory, NC (US)

(72) Inventor: Alexandru Balan, Hickory, NC (US)

(73) Assignee: Alexandru Balan, Granite Falls, NC (US)

( * ) Notice: Subject to any disclaimer, the term of this patent is extended or adjusted under 35 U.S.C. 154(b) by 29 days.

(21) Appl. No.: 16/120,193

(22) Filed: Aug. 31, 2018

(65) Prior Publication Data

US 2020/0070183 A1  Mar. 5, 2020

(51) Int. Cl.

| | |
|---|---|
| *B60R 21/02* | (2006.01) |
| *B05B 1/14* | (2006.01) |
| *B60R 16/08* | (2006.01) |
| *A62C 31/12* | (2006.01) |
| *A62C 3/07* | (2006.01) |

(52) U.S. Cl.
CPC ............ *B60R 21/02* (2013.01); *B05B 1/14* (2013.01); *B60R 16/08* (2013.01); *A62C 3/07* (2013.01); *A62C 31/12* (2013.01)

(58) Field of Classification Search
CPC ......... B60R 21/02; B60R 21/00; B60R 16/08; A62C 3/065; A62C 3/07; A62C 3/08; A62C 31/12; A62C 13/22; A62C 13/68; A62C 13/70; A62C 35/023; A62C 35/08; B05B 9/047; B05B 1/14; B64D 11/062; B64D 11/0619; B64D 37/32
USPC .......................................... 280/748; 180/271
See application file for complete search history.

(56) References Cited

U.S. PATENT DOCUMENTS

| | | | | | |
|---|---|---|---|---|---|
| 2,786,536 | A | * | 3/1957 | Orsini ................. | A62C 13/22 169/6 |
| 2,834,606 | A | * | 5/1958 | Bertrand ............. | B60R 21/20 280/730.1 |
| 3,309,109 | A | * | 3/1967 | Baughman ........... | B60R 21/02 280/748 |
| 3,388,746 | A | * | 6/1968 | Lindberg ............. | A62C 3/08 169/56 |

(Continued)

FOREIGN PATENT DOCUMENTS

| | | | | |
|---|---|---|---|---|
| CA | 2518534 A1 | * | 10/2004 | ............ A62C 3/07 |
| DE | 19901811 A1 | * | 7/2000 | ............ B60R 21/26 |
| FR | 2706313 A1 | * | 12/1994 | ............ A62C 3/07 |

*Primary Examiner* — Ruth Ilan
(74) *Attorney, Agent, or Firm* — Vedder Price P.C.

(57) ABSTRACT

A delivery device for an automobile trauma-reducing safety system includes a base component on which a membrane is supported deflated in an initial state prior to an automobile collision and is inflated in an activated state in response to a triggering event. A spray valve is movably coupled to the base component and is concentrically-aligned with the membrane. The spray valve includes exhaust nozzles, is in a retracted position in the initial state, and is movable towards an extended position in the activated state. A containing area stores a chemical liquid in the initial state and is formed between the spray valve and the deflated membrane. The chemical liquid is forced by the inflated membrane in the activated state to move the spray valve from the retracted position towards the extended position, the chemical liquid being expelled through the exhaust nozzles for reducing trauma to an automobile occupant.

20 Claims, 10 Drawing Sheets

(56) References Cited

U.S. PATENT DOCUMENTS

| | | | | |
|---|---|---|---|---|
| 3,588,142 | A * | 6/1971 | Gorman | B60R 19/205 280/736 |
| 3,853,334 | A * | 12/1974 | Auman | B60R 21/16 280/728.3 |
| 4,177,863 | A * | 12/1979 | Simon | A62C 3/06 169/62 |
| 4,531,607 | A * | 7/1985 | Browne | B60R 21/00 180/282 |
| 4,541,947 | A * | 9/1985 | Clark | F41H 9/00 169/46 |
| 5,649,466 | A * | 7/1997 | Genovese | B64D 45/0015 89/1.11 |
| 5,775,596 | A * | 7/1998 | Whisman | A62C 31/12 169/15 |
| 6,244,625 | B1 * | 6/2001 | Bayer | B60R 19/22 280/748 |
| 6,334,490 | B1 * | 1/2002 | Dille | A62C 3/07 169/14 |
| 7,011,164 | B1 * | 3/2006 | Breazeale | B60R 25/04 169/62 |
| 7,533,734 | B2 * | 5/2009 | Fore | A62C 5/02 169/44 |
| 7,896,121 | B2 * | 3/2011 | Thompson | A62C 3/07 137/351 |
| 2007/0074877 | A1 * | 4/2007 | Thompson | A62C 3/07 169/62 |
| 2014/0231105 | A1 * | 8/2014 | Helasuo | A62C 37/09 169/46 |
| 2015/0075823 | A1 * | 3/2015 | Meier | A62C 3/08 169/46 |
| 2015/0258358 | A1 * | 9/2015 | Popp | A62C 3/08 169/46 |
| 2018/0221695 | A1 * | 8/2018 | Shaw | A62C 35/023 |
| 2019/0299041 | A1 * | 10/2019 | Teoldi | B05B 9/0844 |
| 2019/0315478 | A1 * | 10/2019 | Balan | A62C 3/08 |

* cited by examiner

SAFETY DEVICE FOR DELIVERING AN ANTI-TRAUMA SUBSTANCE IN AN AUTOMOBILE COLLISION

FIELD OF THE INVENTION

The present invention relates generally to an automobile safety system, and, more particularly, to a device for delivering a chemical substance into an automobile when a collision occurs.

BACKGROUND OF THE INVENTION

Safety of individuals is a great concern in all industries associated with passengers or travelers in automobiles. For example, the automobile industry offers products and services that provide protection measures for passengers in case a collision occurs. The protection measures are intended to reduce or eliminate harm to the passengers. Current safety systems, however, are plagued with problems because they do not protect passengers in many collisions and, in fact, sometimes the current safety systems actually cause additional injuries. One known problem, for example, is associated with trauma experience when passengers make sudden contact with and are impacted by components of an automobile. The components include, for example, a steering wheel, a dashboard, a ceiling panel, or a door frame. The impact typically causes harm to, and often kills, occupants that would otherwise survive the collision.

An attempt to solve the harmful and damaging effects of the sudden contact during an automobile collision has been implemented in the form of an airbag system. A typical airbag deploys and inflates to occupy a relatively small volume of the space in the automobile's cabin. The occupied volume is typically limited to a generally small area between a particular component and a space occupied by a driver or passenger, such as a space between the steering wheel and the driver. However, airbag systems are plagues with known problems and disadvantages. For example, one problem of airbag systems is that, after triggering, the deployed bag increases too rapidly in volume and, instead of preventing or reducing trauma, it actually causes trauma by impacting the passengers too forceful and too quickly. Another problem associated with airbag systems is that they provide a short-term safety and only at a limited distance. Yet another problem associated with airbag systems is that they fail to provide safety in the entire cabin of the automobile.

Thus, there is a great need for providing a safety system that prevents, reduces, or minimizes the above and other problems.

SUMMARY OF THE INVENTION

According to one embodiment of the present disclosure, a delivery device for an automobile trauma-reducing safety system includes a base component and a membrane supported by the base component. The membrane is deflated in an initial state of the delivery device prior to an imminent occurrence of an automobile collision, and the membrane is inflated in an activated state of the delivery device. The inflation of the membrane is responsive to a triggering event caused by the imminent occurrence of the automobile collision. A spray valve is movably coupled to the base component and is concentrically-aligned with the membrane. The spray valve has a plurality of exhaust nozzles and is in a retracted position in the initial state and is movable towards an extended position in the activated state. A containing area stores a chemical liquid in the initial state, the containing area being formed in the initial state between an internal surface of the spray valve and the deflated membrane. The chemical liquid is forced by the inflated membrane in the activated state to move the spray valve from the retracted position towards the extended position, the chemical liquid being expelled from the containing area through the plurality of exhaust nozzles for reducing trauma to an automobile occupant.

According to another embodiment of the present disclosure, a safety system for reducing trauma in an automobile collision includes an automobile cabin and a plurality of delivery devices coupled to the automobile cabin for spraying a chemical liquid inside the automobile cabin when a collision occurrence is imminent. The plurality of delivery devices have an initial state prior to the collision and an activated state when an imminent occurrence of the collision is determined. Each of the plurality of delivery devices includes a disc and a deformable membrane having a peripheral edge fixed to the disc, The deformable membrane has an central area within the peripheral edge that is movable in the activated state. Each delivery device further includes a spray valve forming a containing area with the deformable membrane and in which a chemical liquid is stored in the initial state when the spray valve is in a closed position. The spray valve is movable to an open position in response to the deformable membrane applying direct pressure on the chemical liquid in the activated state. The chemical liquid flows through one or more exhaust nozzles of the spray valve into the automobile cabin in the activated state to reduce trauma to an automobile occupant.

According to yet another embodiment of the present disclosure, a method is directed to delivering a chemical liquid inside an automobile cabin for reducing trauma to an occupant in an automobile collision. The method includes storing a chemical liquid in a containing area of a delivery device prior to an automobile collision, the chemical liquid being in direct contact with a membrane and a spray valve of the delivery device. The spray valve is maintained initially in a closed position prior to the automobile collision and in which a plurality of exhaust nozzles of the spray valve are obstructed by a guide ring of the delivery device. In response to determining an imminent occurrence of the automobile collision, a pyrotechnic charge of the delivery device is activated to produce a rapidly-expanding gas. In response to the rapidly-expanding gas, the membrane is deformed to cause movement towards the chemical liquid. In response to the movement of the membrane, the chemical liquid is caused to open the spray valve from its initial closed position such that the plurality of exhaust nozzles are clear of the guide ring. The chemical liquid is delivered from the containing area, via the plurality of exhaust nozzles, into an automobile cabin for reducing trauma to an occupant.

Additional aspects of the disclosure will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
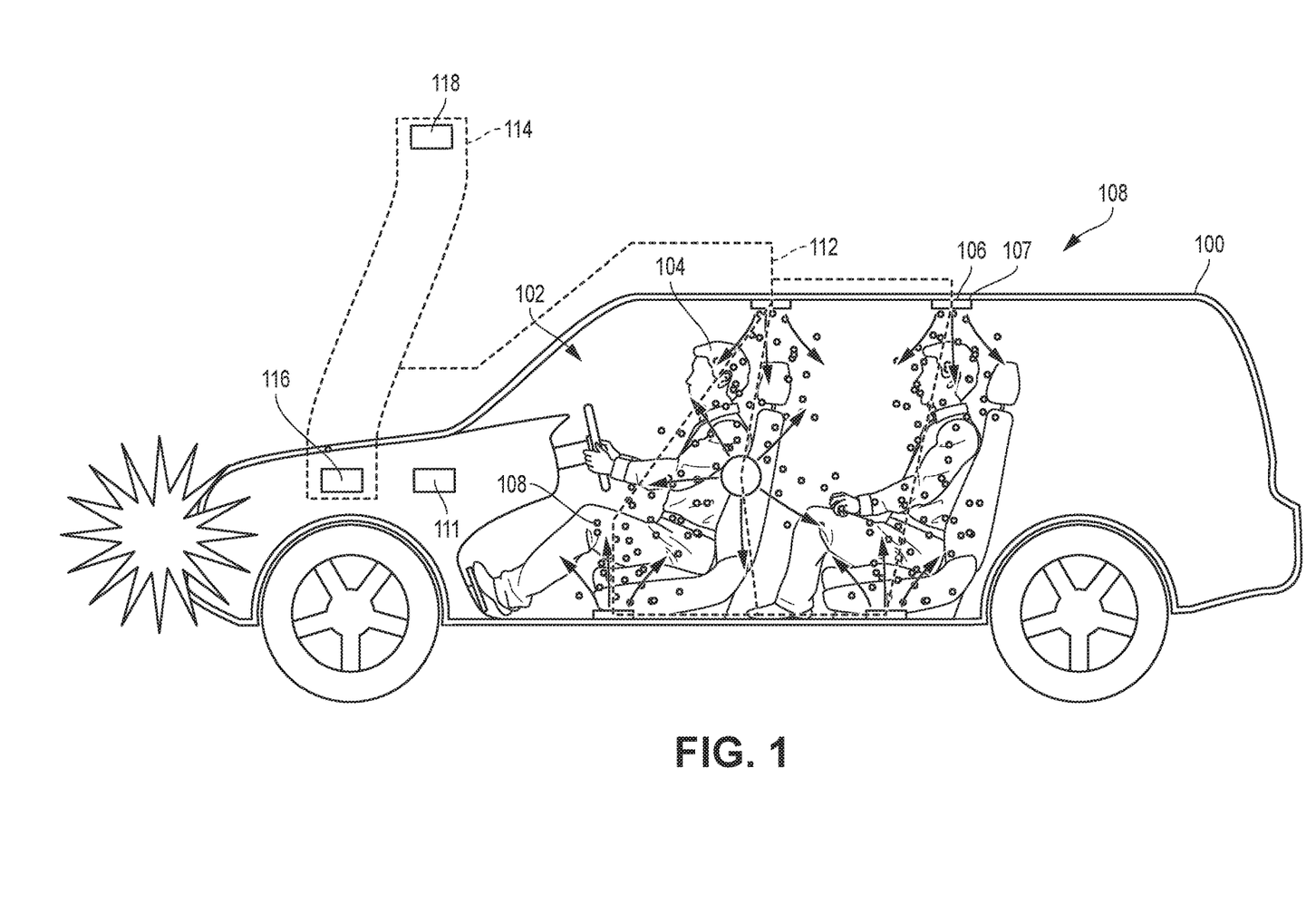
FIG. 1 is a schematic illustrating a trauma-reducing safety system for an automobile, according one exemplary embodiment.

Referring to FIG. 1, an automobile 100 includes a cabin 102 in which one or more occupants 104 travel, either as a driver or a passenger. The cabin 102 include one or more delivery devices 106 (also known as X2 Auto devices) that are configured, as described in more detail below, to deliver a chemical liquid 108 (also known as the SIAAB2 or S2 solution) into the cabin 102 when an imminent occurrence of a collision is determined. Upon delivery, somewhat similar to a shaving foam, the chemical liquid 102 changes into a viscous and permeable material (e.g., foam bubbles) that gradually fills the entire, or at least a sufficient portion of, the cabin 102 to rapidly engulf and protect the occupants 104 from the impact of the collision. The chemical liquid 108 turns the entire interior of the automobile 100 into a single, seamless cushion, uniformly protecting every part of the occupants' bodies in the event of a collision. The chemical liquid 108, upon contact with oxygen in an activated state, changes into impact-absorbing foam that is over 400 times its original volume in liquid form.

More specifically, the viscous material decreases acceleration of the occupants 104 relative to the deceleration of the automobile 100 caused by the collision. The viscous medium creates a permeable, non-toxic environment for free oxygen access in the cabin 102 to allow the occupants 104 to breathe while the viscous material engulfs the occupants 104. As a result, the viscous medium minimizes the effect of the collision, eliminating or greatly reducing traumatic effects to the occupants 104, absorbing up to at least about 45 G-force units. In a relative short time period (e.g., within 30 seconds), based on its chemical composition, the viscous material reduces to a small substance (e.g., dissolves back into its original pre-activation liquid state) that deposits on a floor of the automobile 100 to allow the occupants 104 to exit the automobile 100 after the occurrence of the collision.

The delivery devices 106 and the cabin 102 form a safety system 108 for preventing, or reducing, trauma in an automobile collision. The delivery devices 106 are fixed within the cabin using appropriate fasteners 107. For example, the delivery devices 106 are hidden in a lining of the cabin 102, having one or more exhaust nozzles in fluid communication with the interior of the cabin 102. According to one example, each delivery device 106 consists of light-weight alloys and/or composite materials such that the weight (loaded with the chemical liquid 108) does not exceed 0.44 pounds. According to another example, five delivery devices 106 are mounted in the cabin 102, on the ceiling, floor, and/or doors of the automobile 100. According to another example, a standard car includes three delivery devices 106 in a front section of the cabin 102, two delivery devices 106 in a middle section of the cabin 102, and three delivery devices 106 in a rear section of the cabin 102. In this example, the eight delivery devices 106 provide a protective volume of about three cubic meters ($m^3$) of protective foam, which should fully protect 4-5 occupants 104 in the automobile 100. In alternative embodiments, automobiles, such as buses or trucks, or trains will use an appropriate number of delivery devices 106.

The delivery devices 106 are communicatively coupled to a control system 110 that controls the activation of the delivery devices 106 when a collision becomes imminent. The control system 110 is further communicatively coupled to an automobile's control board 111 for monitoring and determined various aspects related to a potential collision, e.g., automobile speed, automobile deceleration, etc. The control system 110 is configured with appropriate processing circuitry (e.g., processor, memory) and software that determines the moment at which the chemical liquid 108 is delivered into the cabin 102, prior to an inevitable collision, to achieve an anti-trauma state for the occupants 104. In other words, the control system 110 makes a determination that a collision occurrence is imminent, and, based on the determination, sends a control signal 112 that triggers the delivery device 106 to automatically change from an initial state to an activated state (both states being described in more detail below).

The control system 114 is in whole or in part located in the automobile 100 as a local control system 116 and/or at a remote facility as a remote control system 118. Alternatively, the control system 114 is optionally at least in part located in one or more of the delivery devices 106. The control system 114 includes processing circuitry that is communicatively coupled with all of the delivery devices 106, directly or indirectly, using wired and/or wireless connections. Regardless of the coupling configuration or its location, the control system 114 provides the control signal 112 for activating the delivery devices 106.

Figure 2:
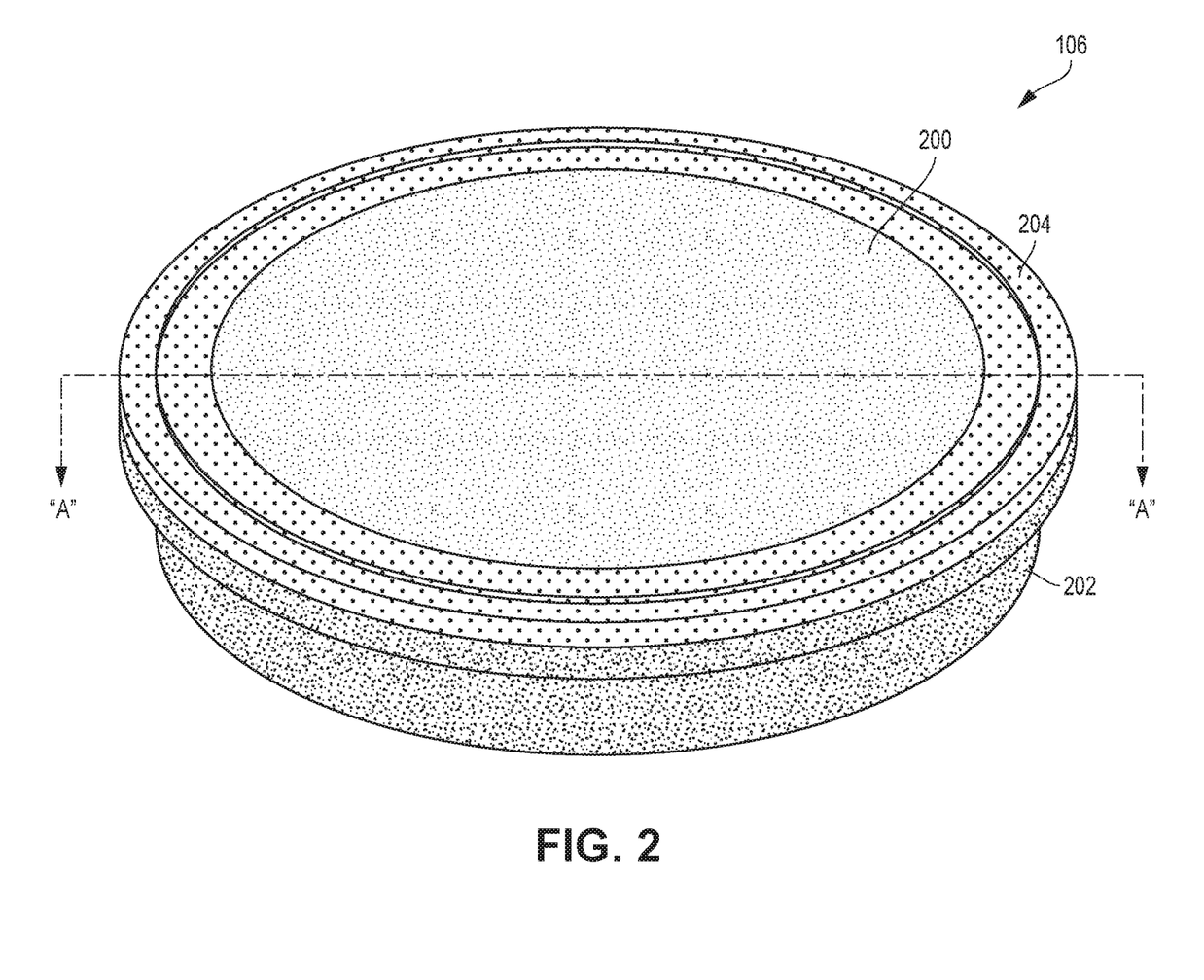
FIG. 2 is a perspective view of a delivery device for the trauma-reducing safety system of FIG. 1.

Referring to FIG. 2, the delivery device 106 includes a spray valve 200 that is mounted within a base component that, according to this example, is in the form of a disc 202. The spray valve 200 is movably fixed relative to the disc 202 via a guide ring 204. In general, as described in more detail below, the guide ring 204 is mounted in part within the disc 202 and the spray valve 200 is mounted within the guide ring 204. As such, these three components of the delivery device 106 are generally concentrically-aligned with the disc 202, which is generally the most exterior component. The guide ring 204 is in part an intermediate component, and the spray valve 200 is the most interior component. According to one example, the delivery device 106 has a diameter of about 4.7 inches (120 millimeters), a height of about 1.4 inches (35 millimeters), and a weight of about 0.9 pounds (0.4 kilograms).

Figure 3:
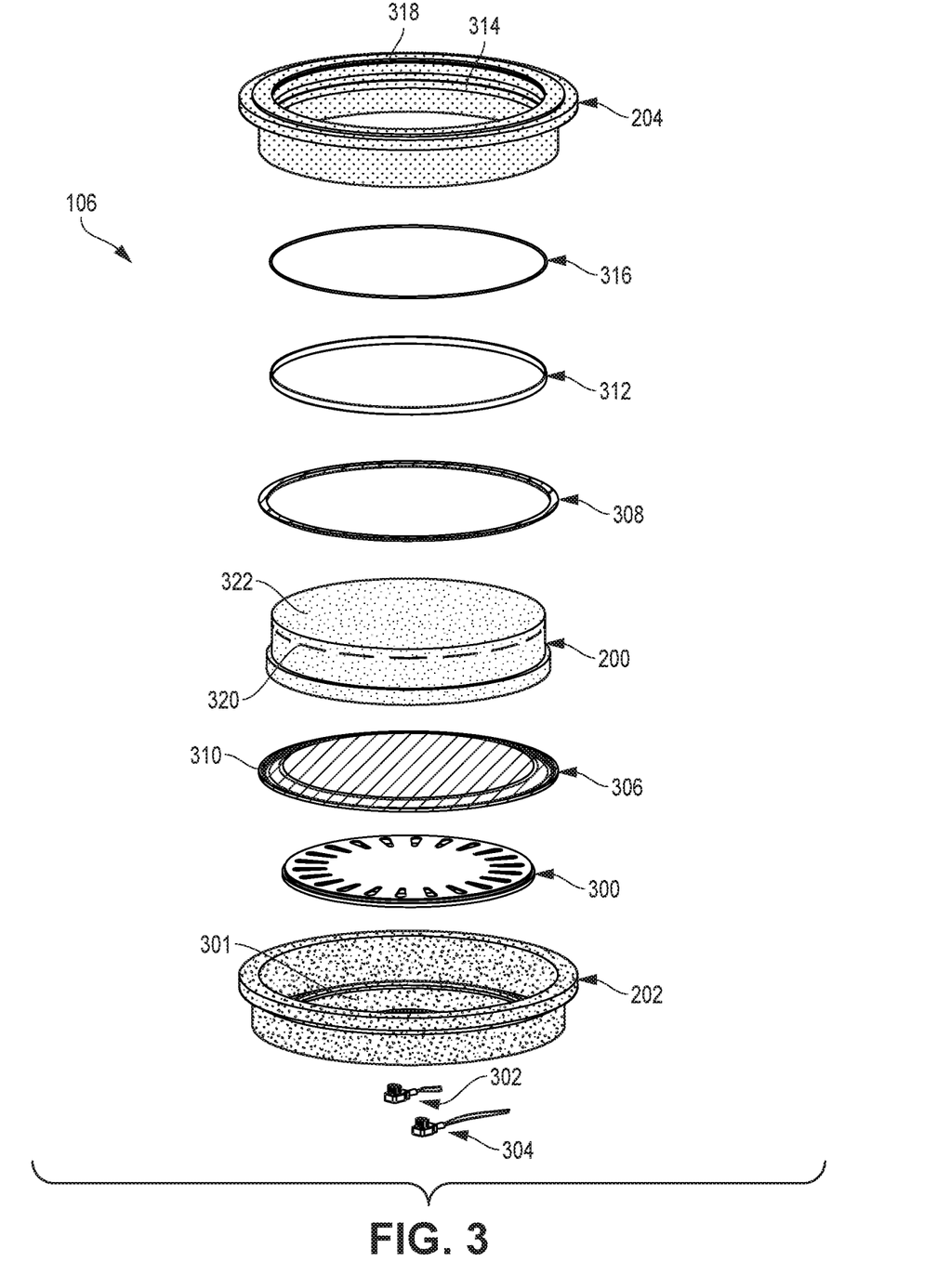
FIG. 3 is an exploded view of the delivery device of FIG. 2.

Referring to FIG. 3, the delivery device 106 includes a plurality of components, in addition to the spray valve 200, the disc 202, and the guide ring 204. The mounting of the plurality of components is generally described in reference to FIG. 3, but FIGS. 4 and 5 further illustrate the configuration of the plurality of components relative to each other. The disc 202 is generally the base structural component in which a pyrotechnic device 300 is mounted on top of a base surface 301 of the disc 202, and which is connected to a first wire connector plug 302 and a second wire connector plug 304. The connector plugs 302, 304 are communicatively coupled to the control system 110 (illustrated in FIG. 1) to receive the control signal 112. Optionally, the pyrotechnic device 300 includes a zirconium detonator that is responsive to a triggering event, which determines that a collision occurrence is imminent. In alternative embodiments, the pyrotechnic device 300 is optionally any device that delivers a pressure force responsive to triggering event. For example, according to one alternative embodiment the pyrotechnic device 300 is a metal capsule of carbon dioxide ($CO_2$) gas or any other neutral gas container that is configured to release the respective gas in response to the triggering event.

A deformable membrane 306 is mounted adjacent to the pyrotechnic device 300, e.g., in the illustrated view the deformable membrane is on top of the pyrotechnic device 300. According to one example, the membrane 306 is made of a polymer or other material that resists corrosion, damage, or brittleness over time when in contact with the liquid chemical 108 or based on other environmental factors.

The delivery device 106 also includes a ring 308, a guide 312, and a seal 316. The ring 308 is mounted within the disc 202 generally overlapping a peripheral edge 310 of the membrane 306. The guide 312 is mounted within a guide channel 314 of the guide ring 204 such that relative movement between the spray valve 200 and the guide ring 204 is easily facilitated. The seal 316 is mounted within a seal channel 318 of the guide ring 204 such that leakage of the chemical liquid 108 (not shown in FIG. 3) is prevented, or at least minimized. It is further noted that the spray valve 200 includes a plurality of exhaust nozzles 320, which, for example, are in the form of perforations, slits, or holes located along an upper periphery of the spray valve 200, below a top surface 322 of the spray valve 200. Similar to the spray valve 200 and the guide ring 204, the seal 316, the guide 312, the ring 308, the membrane 306, and the pyrotechnic device 300 are also concentrically-aligned with the disc 202 to facilitate, advantageously, a small footprint and space for the delivery device 106. In accordance with another benefit of the present disclosure, the exemplary concentric alignment, which includes the concentric alignment of the membrane 306 and the spray valve 200, facilitates the required fast response and movement of the spray valve 200 when the delivery device 106 is activated to open the spray valve 200 from its closed position.

Figure 4:
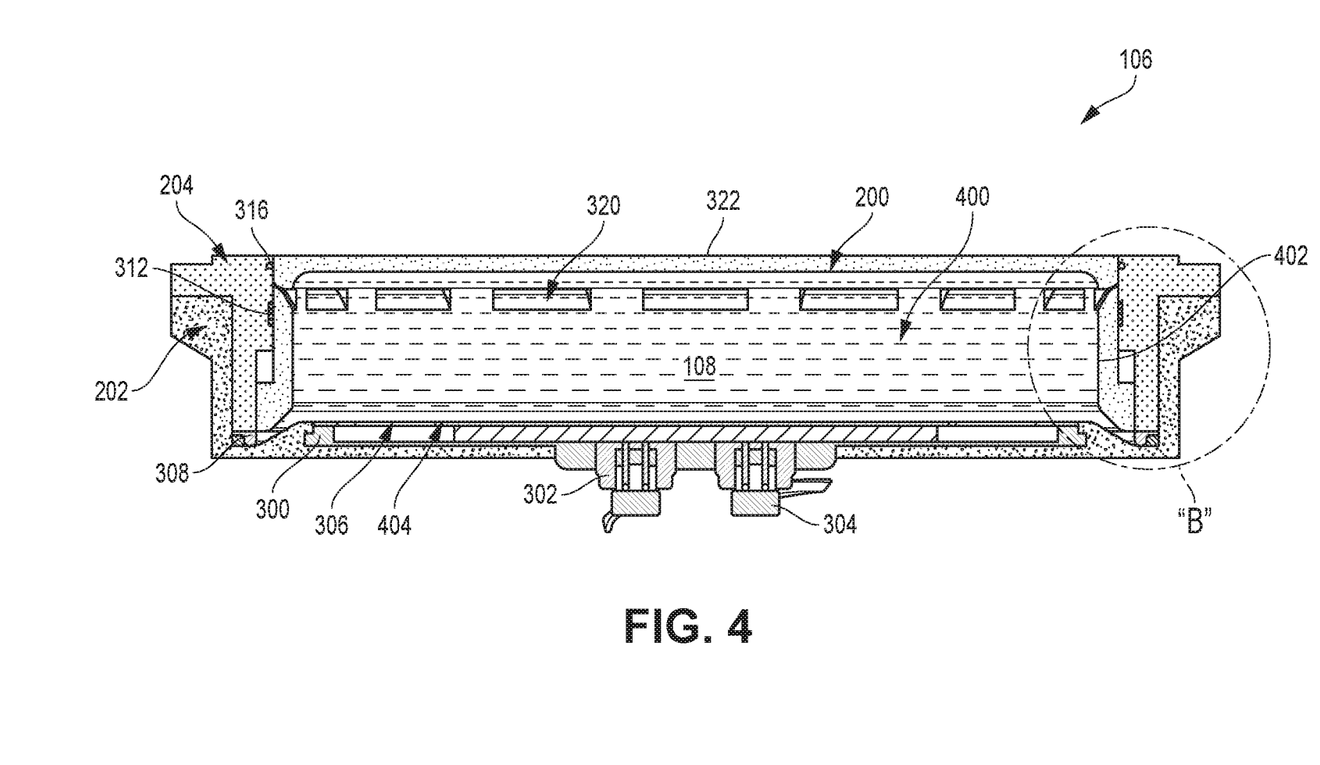
FIG. 4 is a cross-sectional view along lines "A"-"A" of the delivery device of FIG. 2 illustrated in an initial state of the trauma-reducing safety system.
Figure 5:
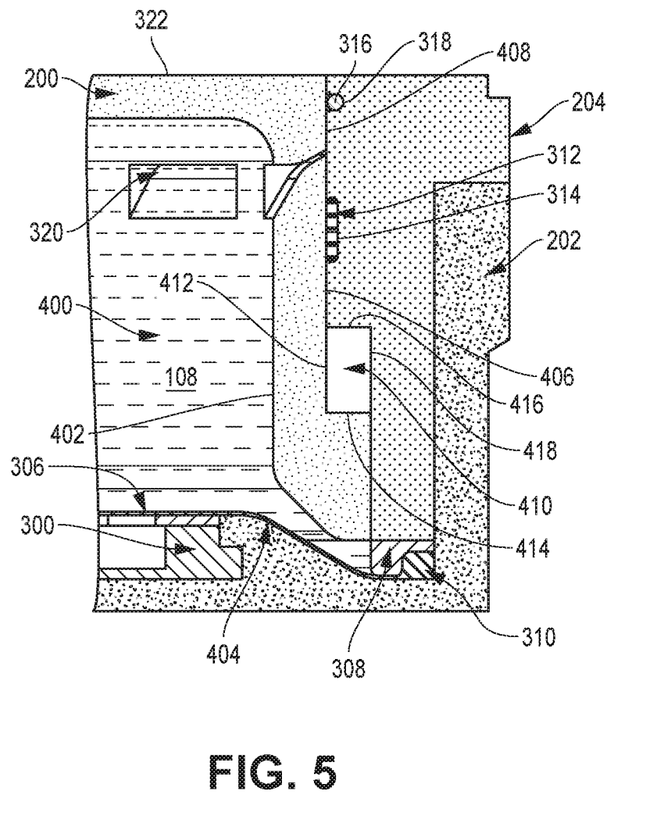
FIG. 5 is an enlarged view of detail "B" shown in FIG. 4.

Referring to FIGS. 4 and 5, the delivery device 106 is illustrated in an initial state, prior to a determination that an occurrence of an automobile collision is imminent. In the initial state, the chemical liquid 108 is stored and maintained under pressure in a containing area 400 that is formed between an internal surface 402 of the spray valve 200 and the membrane 306. The delivery device 106, and, specifically, the containing area 400, is hermetically sealed for storing within the chemical liquid 108. According to one example, the containing area 400 has a capacity to store approximately 50 fluid ounces of the chemical liquid 108. However, in alternative embodiments, the delivery device 106 is configured in accordance with an automobile's technical requirements, including the volume of the cabin 102, the number of occupants 104, and seat row layout.

The membrane 306 is deflated and generally in contact with the base surface 301 of the disc 202 and with the pyrotechnic device 300. Around its peripheral edge 310, the membrane 306 is fixed in place between the ring 308 and the base surface 301 of the disc 202. As such, a relatively large central area 404 of the membrane 306, surrounding the peripheral edge 310, is free to inflate or deform towards the containing area 400. According to the illustrated example, the peripheral edge 310 is generally a thicker ring-like portion relative to the central area 404. The thicker peripheral edge 310 provide the required support when the membrane 306 deforms, preventing rupture during the activated state.

Except for the deformation of the central area 404 of the membrane 306, the spray valve 200 is the only other movable component of the delivery device 106. Accordingly, and advantageously, mechanical wear is minimal. In the initial state, the spray valve 200 is in a retracted, or closed, position in which the exhaust nozzles 320 are obscured (or covered) by the surrounding guide ring 204. In addition, the spray valve 200 is maintained in its retracted position via a generally press fit with the guide ring 204 in which frictional resistance forces are exerted by the contact between an external surface 406 of the spray valve 200 and one or more of an internal surface 408 of the guide ring 204, the guide 312, and/or the seal 316.

In the initial state, the delivery device 106 includes an internal space 410 that generally allows movement of the spray valve 200 along the guide ring 204, as described in more detail below. The internal space 410 is illustrated in this exemplary embodiment is a generally rectangular area formed on two adjacent perpendicular sides by respective sides 412, 414 of the spray valve 200 and on two other adjacent perpendicular sides by respective sides 416, 418 of the guide ring 204.

Figure 6:
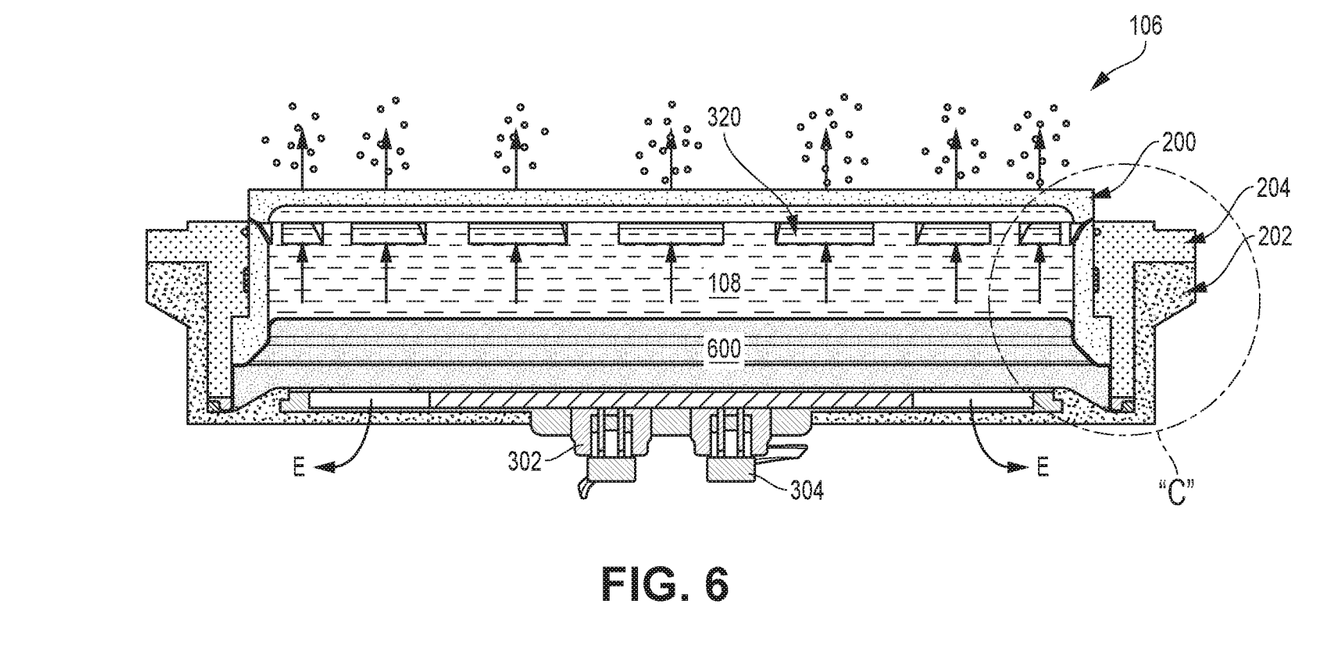
FIG. 6 is a cross-sectional view along lines "A"-"A" of the delivery device of FIG. 2 illustrated in an activated state of the trauma-reducing safety system.
Figure 7:
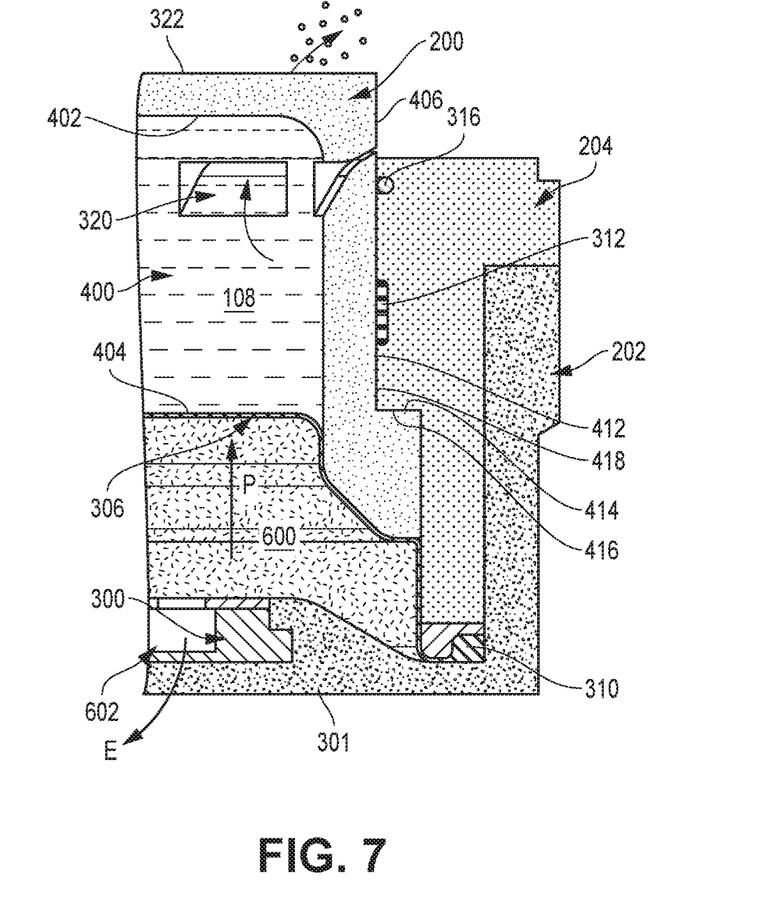
FIG. 7 is an enlarged view of detail "C" shown in FIG. 6.

Referring to FIGS. 6 and 7, the delivery device 106 is now illustrated in an activated state responsive to a triggering event caused by an imminent occurrence determination of an automobile collision, as determined by the control system 110 (illustrated in FIG. 1). In the activated state, a pyrotechnic charge of the pyrotechnic device 300 is detonated in response to receiving the control signal 112 from the control system 110 (via the connector plugs 302, 304), and the detonation causes an explosive gas 600 to form between the membrane 306 and the pyrotechnic device 300. Once released, an increase in pressure, volume, and temperature of the gas 600 cause a force pressure P on the membrane 306, and, more specifically, to the central area 404 of the membrane 306 that is not fixed in place. The pressure P deforms the membrane 306, moving it towards the chemical liquid 108 stored in the containing area 400. As a result, the chemical liquid 108 is forced against the internal surface 402 of the spray valve 200, causing the spray valve 200 to instantly move away from the disc 202 in a sliding motion.

As the spray valve 200 moves towards its extended, or open, position, the exhaust nozzles 320 are now no longer obstructed by (i.e., are clear or free of) the guide ring 204. As such, the chemical liquid 108 is now expelled from the containing area 400 as an active solution S2 through the plurality of exhaust nozzles 320 (and into the cabin 102, as discussed above and illustrated in FIG. 1). The chemical liquid 108 is pushed by the membrane 306 with a constant and high pressure P, e.g., about 8 bars of pressure, to ensure a uniform spraying distribution of the chemical liquid 108. The movement of the spray valve 200 results in effectively removing the internal space 410 (illustrated in FIGS. 4 and 5), having each opposing sides of a first pair of opposing sides 412, 418 and a second pair of opposing sides 414, 416 making contact with each other. Movement of the spray valve 200 stops when the second pair of opposing sides 414, 416—a movable opposing side 414 of the spray valve 200 and a stopper side 416 of the guide ring 204—make contact with each other, with the stopper opposing side 416 acting effectively as a stopper or limiter to the movement of the spray valve 200.

The disc 202 includes at least one exhaust channel or hole 602 along its base surface 301 near the pyrotechnic device 300. A portion of the gas 600 is free to exit as an exhaust gas E through the exhaust channel 602 to prevent, or minimize, damage to the membrane 306 if the detonation results in a higher than expected pressure P.

Figure 8:
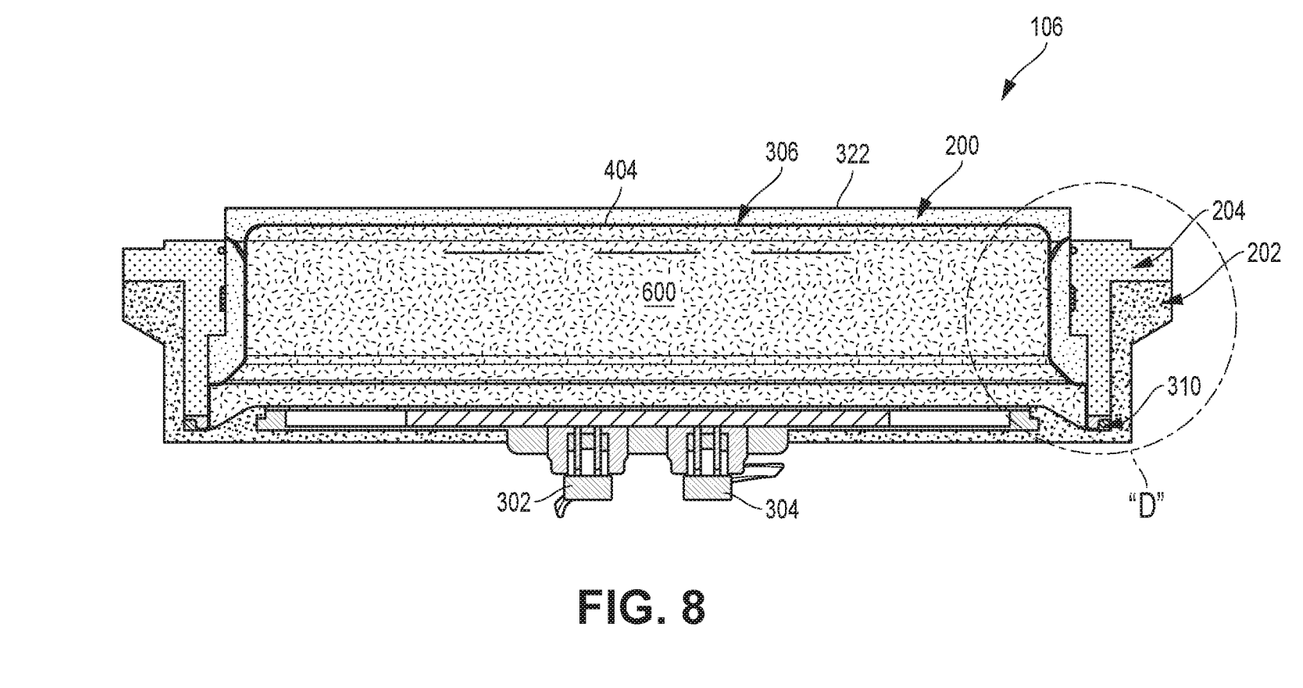
FIG. 8 is a cross-sectional view along lines "A"-"A" of the delivery device of FIG. 2 illustrated in a final state of the trauma-reducing safety system.
Figure 9:
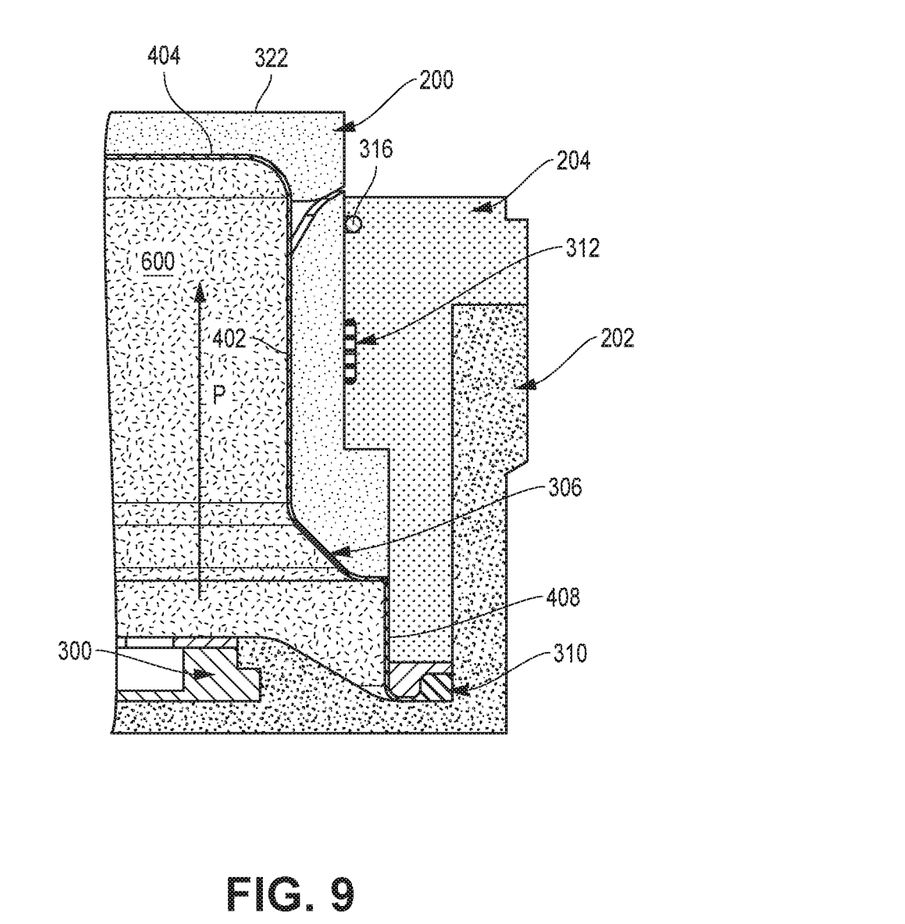
FIG. 9 is an enlarged view of detail "D" shown in FIG. 8.

Referring to FIGS. 8 and 9, the delivery device 106 is now illustrated in a final state, in which the entirety of the chemical liquid 108 (shown in FIGS. 6 and 7) has been expelled from the containing area 400 (shown in FIGS. 6 and 7). In the final state, the containing area 400 has been replaced by the inflated membrane 306 that has its central area 404 in contact with the entire internal surface 402 of the spray valve 200 and a small portion of the internal surface 408 of the guide ring 204. According to one example, the entire process—from detonation to completely expelling the chemical liquid 108—has a working time of about 0.1 seconds.

Figure 10:
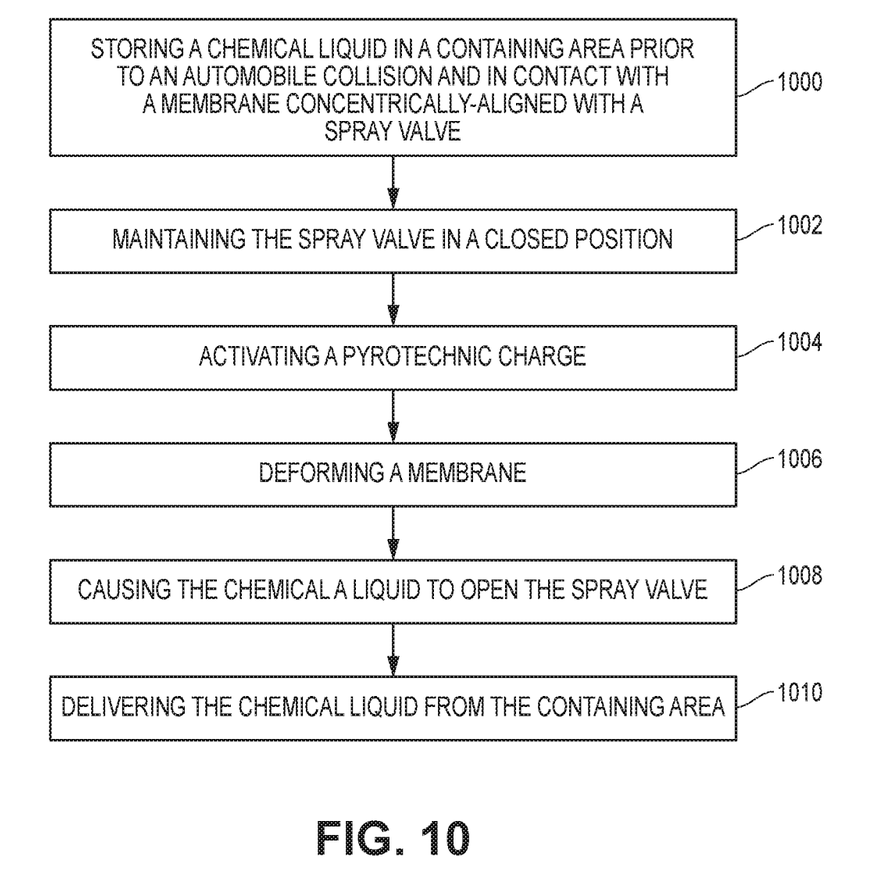
FIG. 10 illustrates a method for delivering a chemical liquid inside an automobile cabin, according to one embodiment.

Referring to FIG. 10, a method is directed to delivering a chemical liquid inside an automobile cabin for reducing trauma to an occupant in an automobile collision. The method includes, at step 1000, storing a chemical liquid in a containing area of a delivery device prior to an automobile collision. The chemical liquid is in direct contact with a membrane and a spray valve of the delivery device that are concentrically-aligned with each other. The method further includes, at step 1002, maintaining the spray valve initially in a closed position prior to the automobile collision. In the closed position, a plurality of exhaust nozzles of the spray valve are obstructed by a guide ring of the delivery device.

At step 1004, in response to determining an imminent occurrence of the automobile collision, the method further includes activating a pyrotechnic charge of the delivery device to produce a rapidly-expanding gas. In response to the rapidly-expanding gas, at step 1006, the method further includes deforming the membrane from a deflated state to an inflated state to cause movement towards the chemical liquid. At step 1008, in response to the movement of the membrane, the method further includes causing the chemical liquid to open the spray valve from its initial closed position such that the plurality of exhaust nozzles are clear of the guide ring. At step 1010, the method further includes delivering the chemical liquid from the containing area, via the plurality of exhaust nozzles, into an automobile cabin for reducing trauma to an occupant.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects. For example, according to the illustrated embodiment described above the disc 202 is represented as a circular disc. However, in alternative embodiments, the disc 202 has other shapes, such as square, rectangular, or oval. The present disclosure is not limited to the specific illustrated example but extends to alternative embodiments other shapes and/or configurations in accordance with the knowledge of one of ordinary skill in the art applied consistent with the presently disclosed principles.

Similarly, the other described components of the delivery device 106 are not limited to the specific generally circular shape or the concentric alignment arrangement of the illustrated embodiment described above, but extend to other shapes and/or configurations in alternative embodiments.

What is claimed is:

1. A delivery device for an automobile trauma-reducing safety system, the delivery device comprising:
   a base component;
   a membrane supported by the base component, the membrane being deflated in an initial state of the delivery device prior to an imminent occurrence of an automobile collision, the membrane being inflated in an activated state of the delivery device in response to a triggering event caused by the imminent occurrence of an automobile collision;
   a spray valve movably coupled to the base component and concentrically-aligned with the membrane, the spray valve having a plurality of exhaust nozzles and being in a retracted position in the initial state and movable towards an extended position in the activated state; and
   a containing area storing a chemical liquid in the initial state, the containing area being formed in the initial state between an internal surface of the spray valve and the deflated membrane, the chemical liquid being forced by the inflated membrane in the activated state to move the spray valve from the retracted position towards the extended position, the chemical liquid being expelled from the containing area through the plurality of exhaust nozzles for reducing trauma to an automobile occupant.

2. The delivery device of claim 1, wherein the base component is in the form of a circular disc having an internal surface that is in contact with the membrane.

3. The delivery device of claim 1, further comprising a ring component that fixes in place a peripheral edge of the membrane to the base component.

4. The delivery device of claim 1, further comprising a pyrotechnic device positioned within the base component and adjacent to the membrane, the pyrotechnic device releasing a gas in the activated state of the delivery device that causes the membrane to inflate, the gas causing the membrane to move towards the spray valve.

5. The delivery device of claim 1, further comprising a guide ring that structurally couples the spray valve and the base component.

6. The delivery device of claim 5, further comprising a guide located in contact and between the spray valve and the guide ring, the guide providing frictional resistance to maintain the spray valve in the retracted position.

7. The delivery device of claim 5, further comprising a ring in contact and between the guide ring and a peripheral edge of the membrane, the ring maintaining the peripheral edge of the membrane fixed in place both in the initial state and in the activated state.

8. The delivery device of claim 5, further comprising a seal in contact and between the spray valve and the guide ring, the seal being located near an external surface of the spray valve to prevent leakage of the chemical liquid.

9. The delivery device of claim 5, further comprising an internal space between the spray valve and the guide ring when the spray valve is in the retracted position, the internal space being filled by the spray valve when the spray valve is in the extended position.

10. The delivery device of claim 9, wherein the internal space is a rectangular area formed on two adjacent perpendicular sides by respective sides of the spray valve, the rectangular area formed on two other adjacent perpendicular sides by respective sides of the guide ring.

11. A safety system for reducing trauma in an automobile collision, the safety system comprising:
an automobile cabin;
a plurality of delivery devices coupled to the automobile cabin for spraying a chemical liquid inside the automobile cabin when a collision occurrence is imminent, the plurality of delivery devices having an initial state prior to the collision and an activated state when an imminent occurrence of the collision is determined, each of the plurality of delivery devices including
a disc,
a deformable membrane having a peripheral edge fixed to the disc, the deformable membrane having a central area within the peripheral edge that is movable in the activated state, at least a portion of the central area being contact with at least a surface of the disc in the initial state, and
a spray valve forming a containing area with the deformable membrane and in which a chemical liquid is stored in the initial state when the spray valve is in a closed position, the spray valve being movable to an open position in response to the deformable membrane applying direct pressure on the chemical liquid in the activated state, the chemical liquid flowing through one or more exhaust nozzles of the spray valve into the automobile cabin in the activated state to reduce trauma to an automobile occupant.

12. The safety system of claim 11, wherein each of the plurality of delivery devices further includes a guide ring that couples the spray valve and the disc to each other, the guide ring having an interior surface in contact with the spray valve and an exterior surface in contact with the disc.

13. The safety system of claim 12, wherein the one or more exhaust nozzles are obstructed in the initial state by the guide ring.

14. The safety system of claim 12, wherein each of the plurality of delivery devices further includes an internal space between the guide ring and the spray valve when the spray valve is in the closed position, movement of the spray valve along the guide ring when the spray valve is in the open position eliminating the internal space.

15. The safety system of claim 11, wherein each of the plurality of delivery devices further includes a pyrotechnic device adjacent to the deformable membrane, the pyrotechnic device releasing a gas in the activated state that forces the deformable membrane to move towards and cause the direct pressure on the spray valve.

16. A method for delivering a chemical liquid inside an automobile cabin for reducing trauma to an occupant in an automobile collision, the method comprising:
storing a chemical liquid in a containing area of a delivery device prior to an automobile collision, the chemical liquid being in direct contact with a membrane and a spray valve of the delivery device that are concentrically-aligned with each other;
maintaining the spray valve initially in a closed position prior to the automobile collision and in which a plurality of exhaust nozzles of the spray valve are obstructed by a guide ring of the delivery device;
in response to determining an imminent occurrence of the automobile collision, activating a pyrotechnic charge of the delivery device to produce a rapidly-expanding gas;
in response to the rapidly-expanding gas, deforming the membrane from a deflated state to an inflated state to cause movement of the membrane towards the chemical liquid;
in response to the movement of the membrane, causing the chemical liquid to open the spray valve from its initial closed position such that the plurality of exhaust nozzles are clear of the guide ring; and
delivering the chemical liquid from the containing area, via the plurality of exhaust nozzles, into an automobile cabin for reducing trauma to an occupant.

17. The method of claim 16, further comprising moving an exterior surface of the spray valve along an interior surface of the guide ring when the spray valve is caused to open from its initial closed position.

18. The method of claim 16, further comprising, in response to deforming the membrane, reducing an internal space located between the spray valve and the guide ring.

19. The method of claim 16, wherein the maintaining of the spray valve in the closed position is based at least in part on frictional resistance between one or more of the spray valve, a seal located between the spray valve and the guide ring, and a guide located between the spray valve and the guide ring.

20. The method of claim 16, further comprising, in response to the determining of the imminent occurrence, causing movement only to the spray valve and to a portion of the membrane to deliver the chemical liquid from the containing area.

* * * * *